Dec. 14, 1965     M. C. COBEY     3,223,083
METHOD FOR ADHESIVELY SECURING TOGETHER
SKIN AND OTHER SOFT TISSUE AND BONE
Filed Sept. 9, 1960
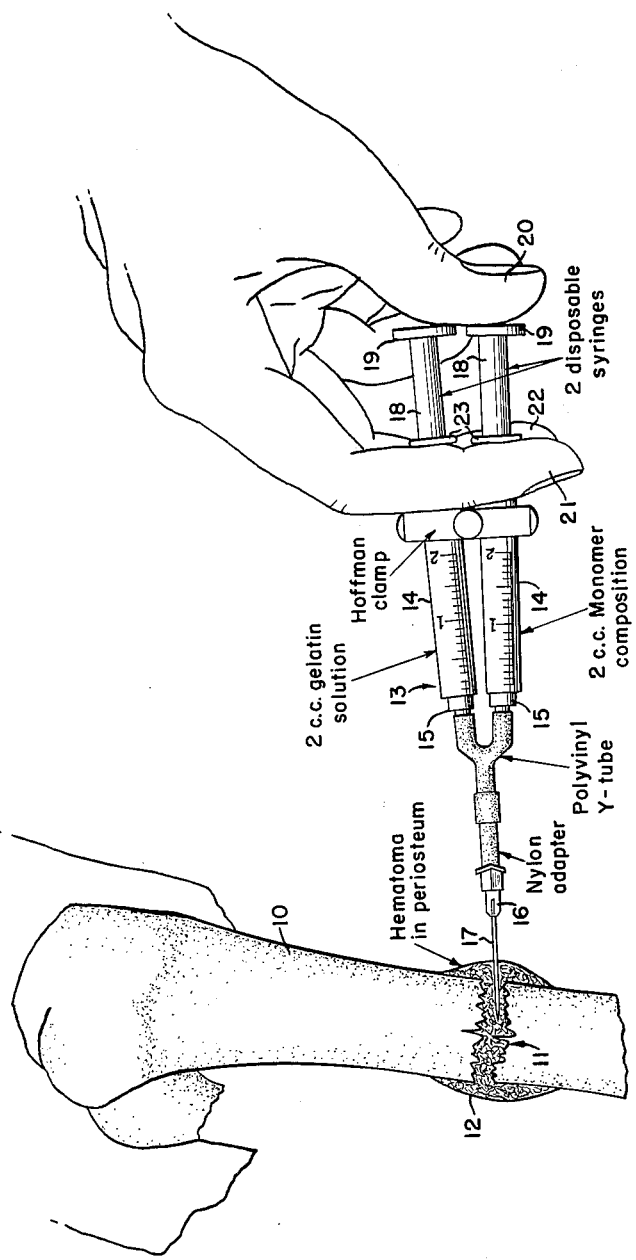
INVENTOR
MILTON C. COBEY
BY Garvey + Garvey
ATTORNEYS

United States Patent Office 3,223,083
Patented Dec. 14, 1965

3,223,083
METHOD FOR ADHESIVELY SECURING TOGETHER SKIN AND OTHER SOFT TISSUE AND BONE
Milton C. Cobey, Washington, D.C., assignor to The President and Directors of Georgetown University, Washington, D.C., a body corporate
Filed Sept. 9, 1960, Ser. No. 54,914
6 Claims. (Cl. 128—92)

This invention relates to a method for adhesively securing damaged living tissue comprising bone, cartilage, tendon and soft tissue, hereinafter collectively referred to as damaged tissue.

Many efforts have been made in the art to adhesively bond tissue securely to aid in the natural repair of damaged tissue, for instance, to set broken bones by alignment and injection of an adhesive material into the site of the break. Such materials in the past have failed for various reasons, such as that they did not set cold with an adequately strong bond, or they did not comprise a material which could be ultimately replaced by repair tissue, or they were prohibitively toxic and developed internal sinus tracts, or drainage infections which were sometimes fatal. Most of the prior materials did not adhere well to wet bone or other tissue, in the presence of moisture.

According to this invention, I have discovered a method of adhesively securing damaged tissue such as severed tissue together, providing an adhesive composition which can set rapidly in the presence of moisture after coating upon or injection into the site of the damaged tissue. My adhesive will set in a few minutes, controllably from about 1–20 minutes, preferably about 3–7 minutes, and it becomes progressively hard as, for instance, a hard set for broken bones at the site of a fracture in about 24 hours. Moreover, my composition is preferably controllably set to be porous, whereby the adhesive material is readily invaded by granulating repair cells of the tissue as the damaged area becomes healed. The adhesive material is ultimately absorbed from the joint and is replaced by good tissue including bone in a normal 4 to 6 week healing process. Finally, my adhesive is substantially non-toxic, and gives rise only occasionally to sinus-tract formations which quickly disappear, manifesting no toxicity and/or allergy.

Thus, in the practice of this invention, it is merely necessary, for instance, in the case of broken bones, to align the broken portions and hypodermically inject into the site of the break, or otherwise coat the contiguous surface portions of the break which are to be joined, with the components of my adhesive composition, while supporting the break surfaces alignedly for a few minutes until the adhesive sets. Further support for the break other than to obtain a preliminary set is not necessary, and a hard set will have occurred in about 24 hours which often allows use of the bone without separation at the site of the fracture. In a similar manner other body tissues, for instance broken tendon, can be drawn together, have its portions aligned, and then adhesively set. Tears, lacerations and incisions can be repaired by applying as by coating the composition along the edge of the cut or tear in the damaged tissue, holding the severed parts together until a set occurs, so that further support as by stitching usually becomes unnecessary after a few minutes of such setting.

It is an object of this invention to provide an internal splint for bones in humans and animals. The splint must be non-toxic systemically and excessively free of irritant properties and form a sufficiently hard mass to primarily adhere to the bone ends and then integrate with the bone and tissue to effect a positive and permanent junction. After years of research and experiment, I have accomplished this object by injecting into the interstice, at the fracture locus, an immediate setting agent, and a special adhesive plastic which can be packaged in vial form for injectable purposes. The agents here used and bone ends have an affinity for one another to integrate the bone ends, the agents, in situ, being non-frangible.

Other objects of the invention will be manifest from the following description of the present preferred form of the invention, taken in connection with the accompanying drawing, wherein:

The figure of the drawing illustrates a fragment of a fractured human or animal bone, showing the application of the composition of this invention to the fracture locus.

My composition comprises essentially monomeric methyl 2-cyano acrylate suitably plasticized and/or blended with other polymeric adhesive modifying components which, together with the methyl 2-cyano acrylate monomer, can be set in situ to adhesively bond damaged tissue.

Another desirable component of the adhesive bond is a water soluble or colloidally suspendible proteinaceous substance such as gelatin which, simultaneously injected with the adhesive, or pre-injected into the site of the damaged tissue to be repaired, operates in combination with the liquid adhesive to introduce porosity throughout the adhesive bond after it sets.

The monomeric methyl 2-cyano acrylate tends to set in contact with the moisture available such as blood and other body fluids accumulated at the site of the damaged tissue. Its adhesiveness as well as the strength of bond which it will develop in the damaged area, to adhesively secure tissue parts together, can be modified. Moreover, the strength ductility, elasticity and porosity of the adhesive material formed in the said bond can be modified. Such modification to control the quality of the bond is effected by the use of plasticizer and/or by the admixture of the monomer with other polymerizable monomers and polymer substances which are compatible with the methyl 2-cyano acrylate and which preferably are soluble or miscible therewith to set to a composite copolymer or mixture of polymers forming the contact polymer bond and sealing the damaged tissue parts.

For purposes hereof it is desirable that the bond be modified, as indicated further, to provide a good plastic adhesive and a bonding material which is non-toxic; but also one which is ultimately absorbable by the living tissue. For this purpose the plastic bond has developed therein a porosity which allows it to be invaded by granulating cells, repair tissue, which permeates the plastic bonding material during the process of its replacement.

The porosity imparting substance is a protein solution such as purified gelatin which mixes with the monomeric methyl 2-cyano acrylate monomer in the site of the damaged tissue to be adhesively bonded. The gelatin, as normal, is relatively quickly absorbed by the tissue or dissolved in the body fluids. Accordingly, when the methyl 2-cyano acrylate sets, it is interspersed with globules of protein which are such relatively soft easily removable substances as to comprise pores in the set plastic body into which the invading cells of the tissue grow. Ultimately, the very porous plastic formed in this manner becomes more readily fully absorbed and displaced by the tissue in the course of healing. That healing process may take several months, but after a full set of about 24 hours, the actual length of time which is required by the damaged tissue to become repaired and actually to replace the hard plastic bonding material is not significant.

The rapid setting monomer component methyl 2-cyano acrylate has in itself the desirable properties of forming a quick, almost immediate, setting bond of substantial and progressively increasing strength. Other components admixed therewith improve its several properties as listed. For instance, the plasticizer modifies the hardness of the adhesive. Other solid polymer substances admixed therewith modify the viscosity of the polymer as well as its physical characteristics. When they are liquid, the polymer substances modify only the final set polymerized form characteristics of the polymerized monomer. It is essential only that these modifying polymer substances be compatible with the monomer i.e. readily suspendable, soluble therein or miscible therewith in useful proportions, impart no toxicity problem and produce a plastic bond which has not excessively or impractically modified the time of setting, and usefully modifies the final physical characteristics thereof.

For the purpose of providing a bonding material having the many desirable physical strength characteristics I may modify the monomer by supplying a plasticizer, preferably a dibasic acid ester of a carboxylic acid, for instance, a lower alkyl ester of a dibasic aliphatic acid whose acid component comprises from about 4–14 carbon atoms and whose alcohol component may be from about 1–8 carbon atoms. Thus, useful aliphatic acids of such plasticizing esters are succinic, glutaric, adipic, pimelic, suberic, azelaic and sebasic, using such alcohols for esterification as methyl, ethyl, isopropyl, isobutyl, secondary amyl and the like. Other common plasticizers may be substituted.

The methyl 2-cyano acrylate monomer may have its physical properties, during and after polymerization, modified by other compatible monomers, partial and completely polymerized resins, and plasticizers can often be omitted from such monomer composition since the properties of the copolymer or resin mixture formed in situ, as the adhesive sets are often useful without the further addition of plasticizer. Where another monomer or polymer is added to the methyl 2-cyano acrylate it may or may not contain a catalyst or a curing agent as may be needed for setting of the particular selected resin, in a manner known in the art. Useful additive polymers and polymer forming monomers or low liquid polymers are epoxy resins, acrylic and methacrylic esters such as methyl methacrylate, ethyl acrylate, polyvinyl chloride, polyvinyl acetate and mixtures of polyvinyl chloride and polyvinyl acetate, polyvinylidene chloride, polyvinyl alcohol, polystyrene and the like as well as mixtures of these monomers and polymers. For additional blending polymer, I prefer an epoxy resin which is a prepolymer of 2,2-(p-hydroxyphenyl)-propane reacted to an intermediate polymeric state with an organic epoxide such as epichlorohydrin and which may contain trace quantities of other polar substances which in the presence of moisture will effect a setting of the epoxy resin. My preferred epoxy resins are available commercially as Shell Epon resins which are normally liquid comprising an epoxide equivalent (grams of resin per gram equivalent of epoxide such as epichlorohydrin) of 175 to 525, and when liquid, having a viscosity at 25° C. between 5 and 160. I prefer Shell Epon 828 which has a viscosity between about 100 and 160 at 25° C. and an epoxide equivalent of 180–195. As indicated, while various curing agents, particularly polyalkylene polyamines such as diethylamino propylamine can be added, I generally use none and prefer thereby to avoid introduction of such extraneous component and a possible toxicant. Other Shell Epon resins available as Epon 820 and Epon 815 which differ substantially only in their viscosity and the degree of prepolymerization, can also be used as well as Epon 834 which is a somewhat heavier liquid.

As indicated, the additive polymer forming substances used to modify the methyl 2-cyano acrylate may be dissolved therein and set to a final polymer mixture therewith. Accordingly the additive polymer forming substance can itself be a monomer and is polymerized in solution together with the methyl 2-cyano acrylate monomer; or it can be in partially polymerized form and after solution in the methyl 2-cyano acrylate will be further polymerized therewith; or it can be a completed polymer which after solution in the methyl 2-cyano acrylate monomer is converted only to a mixture of polymers of modified properties when the solvent methyl 2-cyano acrylate alone polymerizes in the setting. Accordingly, these several monomer to polymer states are generically referred to herein after and will be understood by the term "polymer intermediate."

The methyl 2-cyano acrylate monomer is outstanding for present purposes as an internal splint because it may be set in contact with the moisture in the protein solution or normal body moisture and thereby can be directly injected into or coated upon the wet surfaces of the damaged tissue to be united, such as a few minutes without the use or evolution of heat. That is, it is a cold set and gives a progressively firm bond, developing substantial hardness in a few hours so that after about 24 hours, the adhered tissue, such as the bone, can be used. The properties of that set are modified by plasticizer and other polymer and the porosity and replacement by new tissue is controlled with the dissolved or suspended protein.

Adhered broken bones or severed tissue may have a sufficiently strong bond for physical use by the person or animal without danger of separation of the adhered parts, but other factors obviously will largely determine whether the adhered tissue parts are available for normal use. For instance, a broken bone that has taken on a hard set by adhesion with the present composition may still not be available for free use by the person or animal because the damage may and usually does include damage of neighboring tissue. That is, the site of the break may still be swollen or infected and too painful for muscular use of the repaired broken bone or severed soft tissue so that danger of separation of the break is not the controlling factor in such use. With such background limitations, it is indicated only that the present adhesive bond is sufficiently strong as not likely to separate by use after setting for about 24 hours.

In preferred use of the present adhesive, it is pointed out that the protein contains sufficient water to initiate polymerization of the methyl 2-cyano acrylate monomer so that these must be kept separated until admixture takes place at the site of the broken tissue to be repaired by adhesion. For this purpose, the two compositions are maintained separate until they are mixed in situ at the break. This may be done by first injecting the protein hypodermically into the site to be adhered and then injecting the monomer composition.

Accumulated moisture comprising blood and other body fluids at the site of the break, the damaged tissue, will also initiate and catalyze polymerization of the monomer composition, having the same polymerizing effect as the protein composition. It is often desirable to remove some accumulated body fluids comprising a blood clot from the site of the break, thereby to prevent interference by excessively large quantities of such fluid with the proper coating of wet tissue by the injected compositions. The injection of the protein into the site of the break tends to modify the effect somewhat of such accumulated fluids. Accordingly, the preferred procedure, after removal of excessive moisture when present, is to inject the controlled protein composition and inject the monomer composition whereby intermixture and rapid polymerization takes in situ coating and bonding tissue surfaces, such as broken bone ends, whereby polymerization of the monomer takes place, occluding substantial quantities of protein thereby forming a porous rapidly set adhesive bond. This can be by simultaneous or successive injections.

After removal of excessive fluids from the site of the break (which is not always necessary) the monomer composition and protein composition can be injected into the break using two hypodermics and discharging them into the break simultaneously, so that the compositions entering together, intermix only at the site of the break. Such injection may be effected by mounting the two compositions contained in separate hypodermic cylinders and discharging them simultaneously, whereby one movement of both plungers discharges the contents of both cylinders simultaneously into the site of the break.

In the accompanying drawing the bone is illustrated at 10, the locus of the fracture being indicated at 11 and a blood clot 12 (Hematoma in periosteum). A syringe entity is indicated at 13 and includes graduated cylinders 14, which cylinders converge toward one end and are in communication with a polyvinyl Y-tube through sleeves 15. The Y-tube, in turn, is in communication with a nylon adapter, the latter emptying into a hypodermic needle socket 16, the needle being indicated at 17. The point of the needle is engaged in the interstice of the fracture 11 as illustrated. One of the cylinders 14 is adapted for the reception of a gelatin solution, the other cylinder being adapted for the reception of a monomer composition. The gelatin solution and monomer composition are simultaneously forced from the cylinders 14 by plungers 18, each of which has a finger-engaging head 19. The heads are in sufficiently close proximity to permit operation thereof by the thumb 20 of the user. Two of the fingers of the user, 21 and 22, are interposed between terminal flanges 23 of the cylinders 14 and a Hoffman clamp, as shown in the drawing.

It is also possible, and often desirable, to include materials in the composition which may have a general extraneous beneficial effect. For instance, various salts, normal mineral components of the bone, are sometimes useful as comprising an adequate mineral supply in the joined area and these can be used by suspending or dissolving in the protein composition. If they are to be incorporated in the monomer composition, they would be added thereto as dry salts. The salts may be dicalcium phosphate, calcium carbonate, magnesium chloride, sodium chloride, strontium bromide, calcium gluconate or other non-toxic salts of the alkali or alkaline earth metals. Other trace mineral components may be added, but the listed salts may range up to about 5% of the total slurry in water or protein solution. My compositions are approximately neutral and may range from a pH of about 6 to 8, preferably slightly acid buffered so with an organic acid such as citric acid in the range of about 6.3 to 6.9. Again, while the composition may be supplied with either the monomer composition, dry or as a slurry in the protein, it may also be injected separately directly into the site of the break before or simultaneously with the other liquid components of the adhesive.

Sometimes it is useful to add small solid particles of filler materials such as granulated bone, preferably such solid materials as can ultimately be absorbed by the body. For this purpose, other than such natural body minerals, as listed above, insoluble inorganic components are generally avoided because they are not readily absorbed.

Other useful additives to the compositions hereof are radio-tracer elements added both to outline the site of the said adhesive and also the process of disposal of the solid adhesive through the body in normal absorption thereof. Any of the radioactive tracer elements such as radioactive carbon or nitrogen isotopes can be used, usually building such element into one of the adhesive components by synthesis.

Another useful component are compounds that are radiopaque which give the composition firm outlines in the adhesive bond whereby X-ray pictures more clearly outline the site of the break and the state of repair of the tissue. Such radiopaque substances as tetraiodo fluorescein or B-triiodo phenyl propionic acid, can be used.

It is also possible in the repair of tissues to insert large or small plastic investments to fill large voids, or to replace bone fragments and such preformed plastics may comprise the present composition, with or without filler, such as bone fragments, and which may have been pre-set and inserted in support of the site of the break and adhered to the remaining tissue portions, such as bone ends, by adhesion with the adhesive composition hereof. Finally, of course, the composition may include medicating substances such as antibiotics and other medicating agents useful to promote healing of the damaged tissue.

The following is a general formula of the adhesive composition:

| Solution A—Monomer Composition | Useful Range in Weight Percent | Preferred, Percent |
| --- | --- | --- |
| Methyl-2-cyano acrylate monomer | 40-97 | 75-97 |
| Plasticizer | 0-10 | 3-8 |
| Polymer intermediate | 0-60 | 5-35 |

(Either plasticizer or polymer intermediate being present in quantity of at least 3% of the composition.)

| Solution B—Monomer Composition | Useful Range in Weight Percent | Preferred, Percent |
| --- | --- | --- |
| Protein | 20-75 | 25-60 |
| Water | 25-80 | 60-40 |

Optional components are radioactive tracer elements, radiopaques, minerals, medicating agents, fillers and the like—Q.S.

The following examples illustrate the practice of my invention:

*Example 1*

An adhesive composition comprising 3% dimethyl sebacate, 7% polymethyl methacrylate (Lucite) and the balance, 90%, methyl-2-cyano acrylate monomer, and a separate 50% purified beef gelatin solution in water are simultaneously injected into a fresh break of a femur bone, the bone ends being held manually in alignment during the injection and afterwards are held for a period of five minutes, at the end of which period the adhesive is sufficiently set to maintain the bone alignment without any external support either manually or with an external splint. After 24 hours the break had set sufficiently hard to stand the body weight. In numerous duplicated bone adhesions using this composition, applied as described, less than 3% of the fractured sites thus treated showed evidence of toxicity or allergy as would be exhibited by formation of sinus tracts. No fatalities occurred. The material is absorbed from the bone ends in from 4 to 6 weeks in which the final regrowth and replacement of the polymer bond material with natural bone has taken place.

*Example 2*

The compositions of Example 1 were applied to the gluing of a skin laceration by first coating the lacerated parts with the gelatin solution, then coating with the monomer solution and finally holding the lacerted damaged tissue portions together for a period of 3 or 4 minutes. It is found that the wound healing from skin and other soft tissues is complete in a period of 7 to 12 days. The adhesion of severed skin of this example was repeated with the modification that the gelatin solution was omitted with substantially the same result, indicating that the introduction of porosity into the bond for a laceration is not critical for adhesion of a surface tear. In both applications to skin adhesion of this example, the composition is further applied as a top coating upon the tear and sets as a protective surface skin thereover which sloughs off after a few days, when the wound has substantially healed.

*Example 3*

A composition consisting of 50% methyl-2-cyano acrylate monomer and 50% Epon 828 as identified above, by weight, without addition of curing or catalyst substances, is substituted for the monomer composition of Example 1 and is injected into the site of a broken femur bone and manually held alignedly for a few minutes for a polymer set, following a prior injection of a 50% solution of the gelatin. It is found that the composition sets in about 4 minutes and is completely set in about 24 hours as a firm porous set. The total composition shows early granulation in about 2 weeks and complete absorption in 5 weeks. Only about 2½% of the numerous bone adhesions using this composition tested showed evidence of toxicity which comprised sinuses formed about the break and which cleared up in a few days.

*Example 4*

The monomer composition of Example 1 was replaced by a solution of 97% methyl-2-cyano acrylate monomer plasticized with 3% of dibutyl azelate by weight. The composition applied similarly with a gelatin solution was so highly fluid it tended to set extremely rapidly in 1 to 1½ minutes and to exude somewhat from the joint. Nevertheless, it took on a firm porous set in 24 hours which was absorbed in the usual period without greater evidence of toxicity than in previous examples.

*Example 5*

A solution of 75% methyl-2-cyano acrylate monomer was formed with 25% of vinyl acetate monomer by weight and injected into the site of a break as in Example 1, following preliminary injection of a 25% gelatin solution. The composition took on a preliminary set in about 8 minutes which was fully hardened in about 24 hours and was fully absorbed systematically in healing of the break in 5 weeks. Numerous tests with this composition showed about 5% toxicity reactions.

*Example 6*

A monomer composition comprising 75% by weight methyl-2-cyano acrylate monomer and 25% Epon 828 as identified above was used as in Example 1 and a set was effected in about 5 minutes, the bone being repaired in about 5 weeks with about 3% indications of toxicity in numerous tests.

*Example 7*

A monomer composition comprising 47% methyl-2-cyano acrylate, 47% Epon 828, as defined above, and 6% dimethyl sebacate, all percents by weight, is simultaneously injected into an aligned break of a broken tibia, in quantity of 2 cc. with a similar volume of 25% by weight of pure gelatin solution in water. After 7 minutes the bone had sufficiently set, with manual support for alignment, to need no further support and had set hard in 24 hours. In 5 weeks the bone had completely sealed over. There was no toxic reaction.

While I have herein described a present preferred form of my invention, it is nevertheless to be understood that various changes may be made therein, without departing from the spirit and scope of the claims hereto appended.

What I claim is:

1. The process of coating and adhesively securing together parts of severed living skin and other soft tissue comprising applying to the site of the tissue to be secured a non-toxic water-polymerizable liquid monomer adhesive composition comprising methyl cyanoacrylate monomer and allowing the adhesive to set upon the tissue while severed areas are being held together.

2. A process of adhering broken bones of a living body, comprising aligning the bone parts to position for setting, injecting into the site of the break a non-toxic water polymerizable liquid monomer substance comprising methylcyano acrylate and an aqueous gelatin solution reactable therewith and supporting the bone parts alignedly for a short period of time until the adhesive sets.

3. The process of adhering severed living damaged skin and other soft tissue comprising coating the severed surfaces with a moisture polymerizable organic non-toxic monomer adhesive composition containing in substantial quantity methyl-2-cyano acrylate monomer and supporting the severed parts of the living tissue alignedly together until the adhesive sets.

4. The method as defined in claim 3 wherein the monomer composition contains a small quantity of a plasticizer.

5. The method as defined in claim 3 wherein the monomer is blended with a compatible polymer adapted to form a hard polymer mixture therewith in situ in the tissue.

6. The method as defined in claim 3 wherein the adhesive composition comprises from 40–97% of methyl-2-cyano acrylate monomer and from 3–60% of a polymer-forming substance of the group consisting of epoxy resins, other lower alkyl esters of methacrylic acid, vinyl chloride, vinyl acetate, mixtures of vinyl chloride and vinyl acetate, vinylidene chloride, polyvinyl alcohol, polystyrene, mixtures of said monomers, and polymers thereof.

References Cited by the Examiner

UNITED STATES PATENTS

| | | | |
|---|---|---|---|
| 2,439,081 | 4/1948 | Dicke et al. | 260—85.5 |
| 2,751,314 | 6/1956 | Slaehle | 117—164 |
| 2,798,063 | 7/1957 | Fowler | 260—6 |
| 2,885,374 | 5/1959 | Sweeney | 260—6 |
| 2,956,884 | 10/1960 | Caldwell | 260—6 |
| 2,982,749 | 5/1961 | Friedrich et al. | 260—23 |
| 3,030,951 | 4/1962 | Mandarino | 128—92 |

OTHER REFERENCES

Block: "Bonding of Fractures by Plastic Adhesives," Journal of Bone and Joint Surgery, vol. 40B, No. 4, Nov. 1958, pp. 804–810 relied on.

RICHARD A. GAUDET, *Primary Examiner.*

HAROLD B. WHITMORE, JORDAN FRANKLIN, J. P. MILNAMOW, H. R. GOLDBERG, J. W. HINEY, JR., *Assistant Examiners.*